(12) United States Patent
Ishikawa et al.

(10) Patent No.: US 11,732,795 B2
(45) Date of Patent: Aug. 22, 2023

(54) DRIVE DEVICE

(71) Applicant: Nidec Corporation, Kyoto (JP)

(72) Inventors: Yuki Ishikawa, Kyoto (JP); Takanobu Oyama, Kyoto (JP); Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 20 days.

(21) Appl. No.: 17/603,969

(22) PCT Filed: Apr. 9, 2020

(86) PCT No.: PCT/JP2020/015933
§ 371 (c)(1),
(2) Date: Oct. 15, 2021

(87) PCT Pub. No.: WO2020/213509
PCT Pub. Date: Oct. 22, 2020

(65) Prior Publication Data
US 2022/0205530 A1 Jun. 30, 2022

(30) Foreign Application Priority Data
Apr. 19, 2019 (JP) ................. 2019-080354

(51) Int. Cl.
*F16H 57/04* (2010.01)
*B60K 1/00* (2006.01)
*B60K 11/02* (2006.01)
*H02K 9/19* (2006.01)
*F16H 57/037* (2012.01)
*F16H 57/02* (2012.01)

(52) U.S. Cl.
CPC ......... *F16H 57/0475* (2013.01); *B60K 1/00* (2013.01); *B60K 11/02* (2013.01); *F16H 57/037* (2013.01);
(Continued)

(58) Field of Classification Search
CPC ............... F16H 57/0475; F16H 57/037; F16H 57/0404; F16H 57/0424; F16H 57/0441;
(Continued)

(56) References Cited

U.S. PATENT DOCUMENTS

| 5,372,213 A * | 12/1994 | Hasebe ................... B60K 1/02 184/6.12 |
| 7,468,988 B2 | 12/2008 | Pail et al. |

(Continued)

FOREIGN PATENT DOCUMENTS

| CN | 203634918 U | 6/2014 |
| CN | 109643933 A | 4/2019 |

(Continued)

OTHER PUBLICATIONS

Official Communication issued in International Patent Application No. PCT/JP2020/015933, dated Jun. 30, 2020.
(Continued)

*Primary Examiner* — Colby M Hansen
(74) *Attorney, Agent, or Firm* — Keating & Bennett

(57) ABSTRACT

A drive device includes a motor, a housing, an oil passage in the housing, an oil pump in which a portion of the oil passage is provided, and a strainer inside the housing and in which a portion of the oil passage is provided. The oil passage includes an oil sump in which oil is accumulated and a suction path connecting the oil sump and the oil pump. A central axis of the oil pump extends in a direction intersecting the vertical direction. The strainer is in the suction path. The strainer includes a suction port to suction oil from the oil sump, a discharge port to discharge oil toward the oil pump, and a filter. The suction port opens downward in the vertical direction. The discharge port opens in a direction intersecting the vertical direction toward the oil pump.

10 Claims, 4 Drawing Sheets

(52) U.S. Cl.
CPC ..... *F16H 57/0404* (2013.01); *F16H 57/0424* (2013.01); *F16H 57/0441* (2013.01); *F16H 57/0457* (2013.01); *F16H 57/0483* (2013.01); *H02K 9/19* (2013.01); *B60K 2001/001* (2013.01); *F16H 2057/02034* (2013.01); *F16H 2057/02052* (2013.01)

(58) Field of Classification Search
CPC ............. F16H 57/0457; F16H 57/0483; F16H 2057/02034; F16H 57/02052; B60K 1/00; B60K 11/02; B60K 2001/001; H02K 9/19
USPC .......................................................... 475/150
See application file for complete search history.

(56) References Cited

U.S. PATENT DOCUMENTS

| | | | |
|---|---|---|---|
| 9,266,423 | B2 | 2/2016 | Hoshinoya et al. |
| 10,879,769 | B2 | 12/2020 | Ishikawa et al. |
| 2011/0297258 | A1 | 12/2011 | Tanaka et al. |
| 2015/0152954 | A1* | 6/2015 | Kajikawa ............ F16H 57/0457 74/467 |
| 2019/0173358 | A1 | 6/2019 | Ishikawa et al. |
| 2019/0234508 | A1* | 8/2019 | Francis ............... F16H 57/0423 |
| 2021/0288550 | A1 | 9/2021 | Ishikawa et al. |

FOREIGN PATENT DOCUMENTS

| | | |
|---|---|---|
| JP | 2009-121552 A | 6/2009 |
| JP | 2013-013195 A | 1/2013 |
| JP | 5139475 B2 | 2/2013 |
| JP | 2015-178053 A | 10/2015 |
| JP | 2016-120774 A | 7/2016 |

OTHER PUBLICATIONS

Official Communication issued in corresponding Chinese Patent Application No. 202080029096.8, dated Jun. 10, 2023.

* cited by examiner

DRIVE DEVICE

CROSS-REFERENCE TO RELATED APPLICATIONS

This is a U.S. national stage of application No. PCT/JP2020/015933, filed on Apr. 9, 2020, and priority under 35 U.S.C. § 119(a) and 35 U.S.C. § 365(b) is claimed from Japanese Patent Application No. 2019-080354, filed on Apr. 19, 2019; the entire disclosures of which are hereby incorporated herein by reference.

1. FIELD OF THE INVENTION

The present disclosure relates to a drive device.

2. BACKGROUND

A drive device that rotates an axle of a vehicle is known. The drive device includes a motor, a housing that accommodates the motor, an oil passage that is provided in the housing, an oil pump that is provided in the housing and in which a part of the oil passage is disposed, and a strainer that is provided inside the housing and in which a part of the oil passage is disposed. A hydraulic control circuit of a conventional vehicular power transmission apparatus includes a lubricating oil producing circuit that constitutes a portion of the hydraulic control circuit. The lubricating oil producing circuit is configured to include an oil pump, an oil strainer that traps foreign substances in the operating oil (lubricating oil) when the operating oil is sucked up from the oil pan, and a first oil passageway that provides communication between a first port of the oil pump and the oil strainer.

When the central axis of the oil pump extends in the horizontal direction, i.e., when the oil pump is provided in the transverse posture, a path in the oil passage where the oil is sent from the oil sump to the oil pump changes its orientation from the vertical direction to the horizontal direction. Therefore, the path where the oil is sent from the oil sump to the oil pump tends to have a complicated configuration, and a space for providing the path tends to be large.

SUMMARY

An example embodiment of the present disclosure provides a drive device that rotates an axle of a vehicle. The drive device includes a motor, a housing that accommodates the motor, an oil passage that is provided in the housing, an oil pump that is provided in the housing and in which a portion of the oil passage is provided, and a strainer that is provided inside the housing and in which a portion of the oil passage is provided. The oil passage includes an oil sump that is inside the housing and in which oil accumulates, and a suction path that connects the oil sump and the oil pump. A first central axis that is a central axis of the oil pump extends in a direction intersecting the vertical direction. The strainer is positioned in the suction path. The strainer includes a suction port to suction oil from the oil sump, a discharge port to discharge oil toward the oil pump, and a filter that is provided inside the strainer and positioned between the suction port and the discharge port. The suction port opens downward in the vertical direction. The discharge port opens in a direction intersecting the vertical direction toward the oil pump.

The above and other elements, features, steps, characteristics and advantages of the present disclosure will become more apparent from the following detailed description of the example embodiments with reference to the attached drawings.

DETAILED DESCRIPTION

Figure 1:
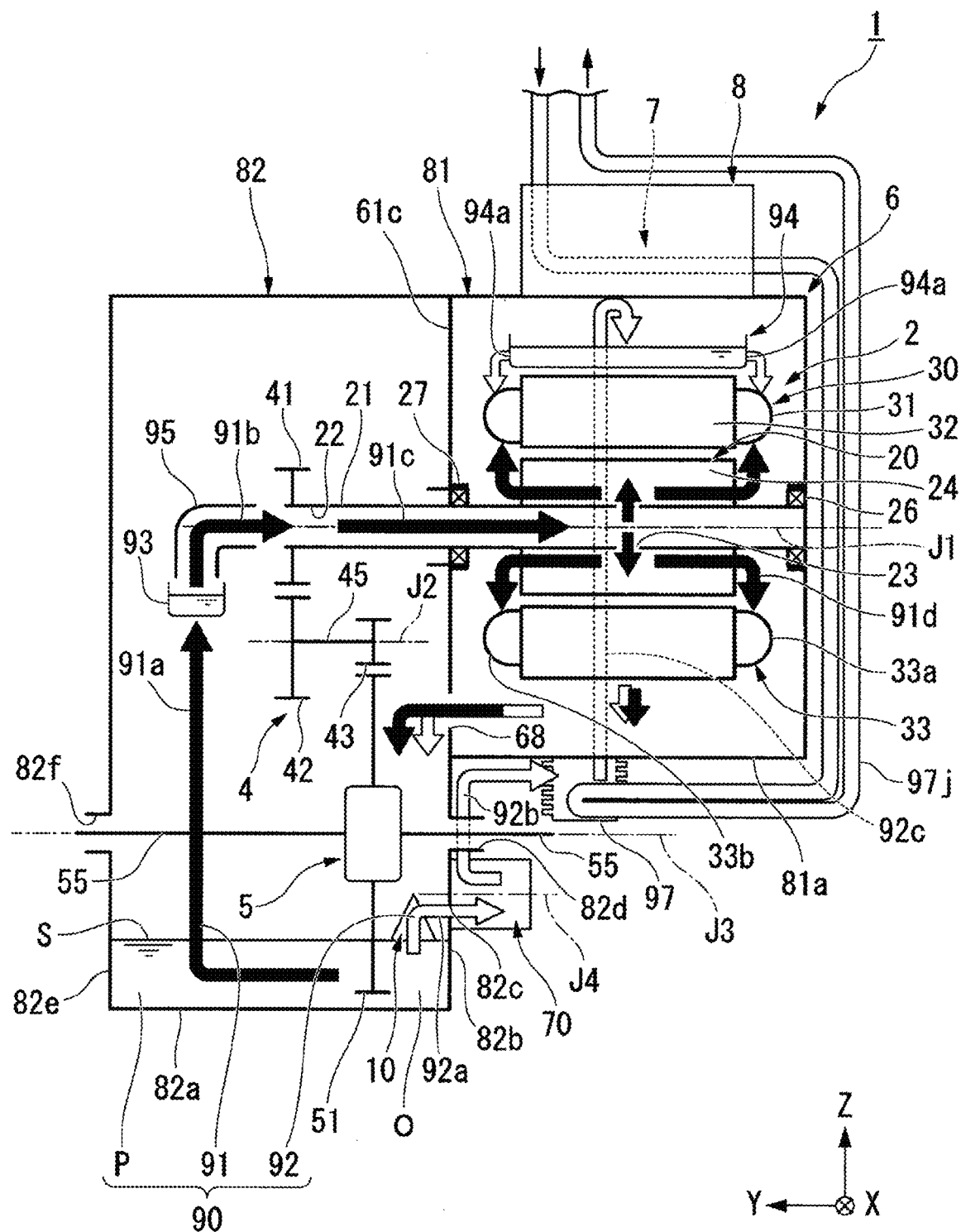
FIG. 1 is an overall configuration view schematically showing a drive device according to an example embodiment of the present disclosure.

In the following description, the vertical direction is defined based on the positional relationship when a drive device 1 of example embodiments shown in each drawing is mounted on a vehicle not illustrated positioned on a horizontal road surface. In addition, in the figures, an XYZ coordinate system is shown appropriately as a three-dimensional orthogonal coordinate system. In the XYZ coordinate system, a Z axis direction is the vertical direction. A +Z side is an upper side in the vertical direction, and a −Z side is a lower side in the vertical direction. In the following description, the vertically upper side will be referred to simply as "up" (upside, upper, upper side, upward), and the vertically lower side the "lower side" will be referred to simply as "down" (downside, lower, lower side, downward). An X axis direction is a direction orthogonal to the Z axis direction and a front-rear direction of the vehicle equipped with the drive device 1. In the example embodiment below, a +X side is a front side of the vehicle, and a −X side is a rear side of the vehicle. A Y axis direction is a direction orthogonal to the X axis direction and the Z axis direction, and is a right-left direction of the vehicle, i.e., a vehicle width direction. In the example embodiment below, a +Y side is a left side of the vehicle, and a −Y side is a right side of the vehicle. The front-rear direction and the right-left direction are horizontal directions orthogonal to the vertical direction.

The positional relationship in the front-rear direction is not limited to the positional relationship in the example embodiment below, and the +X side may be the rear side of the vehicle, and the −X side may be the front side of the vehicle. In this case, the +Y side is the right side of the vehicle, and the −Y side is the left side of the vehicle.

A motor axis J1 shown appropriately in the drawings extends in the Y axis direction, i.e., the right-left direction of the vehicle. The motor axis J1 is a central axis of a motor 2 included in the drive device 1. In the following description, unless otherwise specified, a direction parallel to the motor axis J1 is simply referred to as an "axial direction" (axially), the radial direction about the motor axis J1 is simply referred to as a "radial direction" (radially), and the circumferential direction about the motor axis J1, i.e., around the axis of the motor axis J1 is simply referred to as a "circumferential direction" (circumferentially). In the present description, a "parallel direction" includes a substantially parallel direction, and an "orthogonal direction" includes a substantially orthogonal direction.

The drive device 1 according to the present example embodiment is mounted in a vehicle having the motor 2 as a power source, such as a hybrid vehicle (HEV), a plug-in hybrid vehicle (PHV), and an electric vehicle (EV), and is used as the power source thereof.

As shown in FIG. 1, the drive device 1 includes the motor 2, a decelerator 4, a differential 5, a housing 6, an oil passage 90 for oil O, an oil pump 70, a strainer 10, an inverter 7, and an inverter case 8. The housing 6 has a motor accommodation portion 81 accommodating the motor 2 therein, and a gear accommodation portion 82 accommodating the decelerator 4 and the differential 5 therein. That is, the housing 6 accommodates the motor 2. The gear accommodation portion 82 is positioned to the left of the motor accommodation portion 81. That is, the gear accommodation portion 82 and the motor accommodation portion 81 are disposed at different positions from each other in the axial direction (Y axis direction) of the motor axis J1. In the present example embodiment, a direction (−Y side) of the axial direction from the gear accommodation portion 82 toward the motor accommodation portion 81 is sometimes referred to as an one axial side, and a direction (+Y side) from the motor accommodation portion 81 toward the gear accommodation portion 82 is sometimes referred to as the other axial side.

In the present example embodiment, the motor 2 is an inner rotor motor. The motor 2 includes a rotor 20, a stator 30, and bearings 26 and 27. The rotor 20 rotates about a motor axis J1 extending in the horizontal direction. The rotor 20 has a shaft 21 and a rotor body 24. Although not illustrated, the rotor body 24 has a rotor core and a rotor magnet fixed to the rotor core. Torque of the rotor 20 is transmitted to the decelerator 4.

The shaft 21 extends along the axial direction about the motor axis J1. The shaft 21 rotates about the motor axis J1. The shaft 21 is a hollow shaft provided with a hollow portion 22 inside. The shaft 21 is provided with a communication hole 23. The communication hole 23 extends in the radial direction and connects the hollow portion 22 with the outside of the shaft 21.

The shaft 21 extends across the motor accommodation portion 81 and the gear accommodation portion 82 of the housing 6. The left end of the shaft 21 is positioned inside the gear accommodation portion 82. A first gear 41 described later of the decelerator 4 is fixed to the left end of the shaft 21. The shaft 21 is rotatably supported by the bearings 26 and 27.

The stator 30 is radially opposed to the rotor 20 with a gap therebetween. In the present example embodiment, the stator 30 is positioned radially outside the rotor 20. The stator 30 has a stator core 32 and a coil assembly 33. The stator core 32 is fixed to the inner peripheral surface of the motor accommodation portion 81. Although not illustrated, the stator core 32 has an axially extending cylindrical core back and a plurality of teeth extending radially inside from the core back.

The coil assembly 33 is mounted on the stator core 32. The coil assembly 33 has a plurality of coils 31. The plurality of coils 31 are attached to the respective teeth of the stator core 32 with an insulator (not illustrated) interposed therebetween. The plurality of coils 31 are arranged side by side in the circumferential direction. The plurality of coils 31 are arranged at equal intervals along the circumferential direction throughout the circumference. Although not illustrated, the coil assembly 33 may have a binding member or the like for binding the coils 31, or may have a connecting wire for connecting the coils 31 with one another.

The coil assembly 33 has coil ends 33a and 33b projecting axially from the stator core 32. The coil end 33a is a part projecting to the right side from the stator core 32. The coil end 33b is a part projecting to the left side from the stator core 32. The coil end 33a includes a part projects to the right side relative to the stator core 32 of each coil 31 included in the coil assembly 33. The coil end 33b includes a part projects to the left side relative to the stator core 32 of each coil 31 included in the coil assembly 33. In the present example embodiment, the coil ends 33a and 33b are annular about the motor axis J1. Although not illustrated, the coil ends 33a and 33b may include binding members or the like for binding the coils 31, or may include connecting wires for connecting the coils 31 with one another.

The bearings 26 and 27 rotatably support the rotor 20. The bearings 26 and 27 are, for example, ball bearings. The bearing 26 is a bearing rotatably supporting a part of the rotor 20 positioned on the right side relative to the stator core 32. In the present example embodiment, the bearing 26 supports a part of the shaft 21 positioned on the right side relative to the part to which the rotor body 24 is fixed. The bearing 26 is held by a wall portion covering the right side of the rotor 20 and the stator 30 in the motor accommodation portion 81.

The bearing 27 is a bearing rotatably supporting a part of the rotor 20 positioned on the left side relative to the stator core 32. In the present example embodiment, the bearing 27 supports a part of the shaft 21 positioned on the left side relative to the part to which the rotor body 24 is fixed. The bearing 27 is held in a partition wall 61c described later.

The decelerator 4 is connected to the motor 2. The decelerator 4 is connected to the left end of the shaft 21. The decelerator 4 reduces the rotational speed of the motor 2 and increases the torque output from the motor 2 according to the reduction ratio. The decelerator 4 transmits torque outputted from the motor 2 to the differential 5. The decelerator 4 has a first gear 41, a second gear 42, a third gear 43, and an intermediate shaft 45. That is, the decelerator 4 has the gears 41, 42, and 43.

Figure 2:
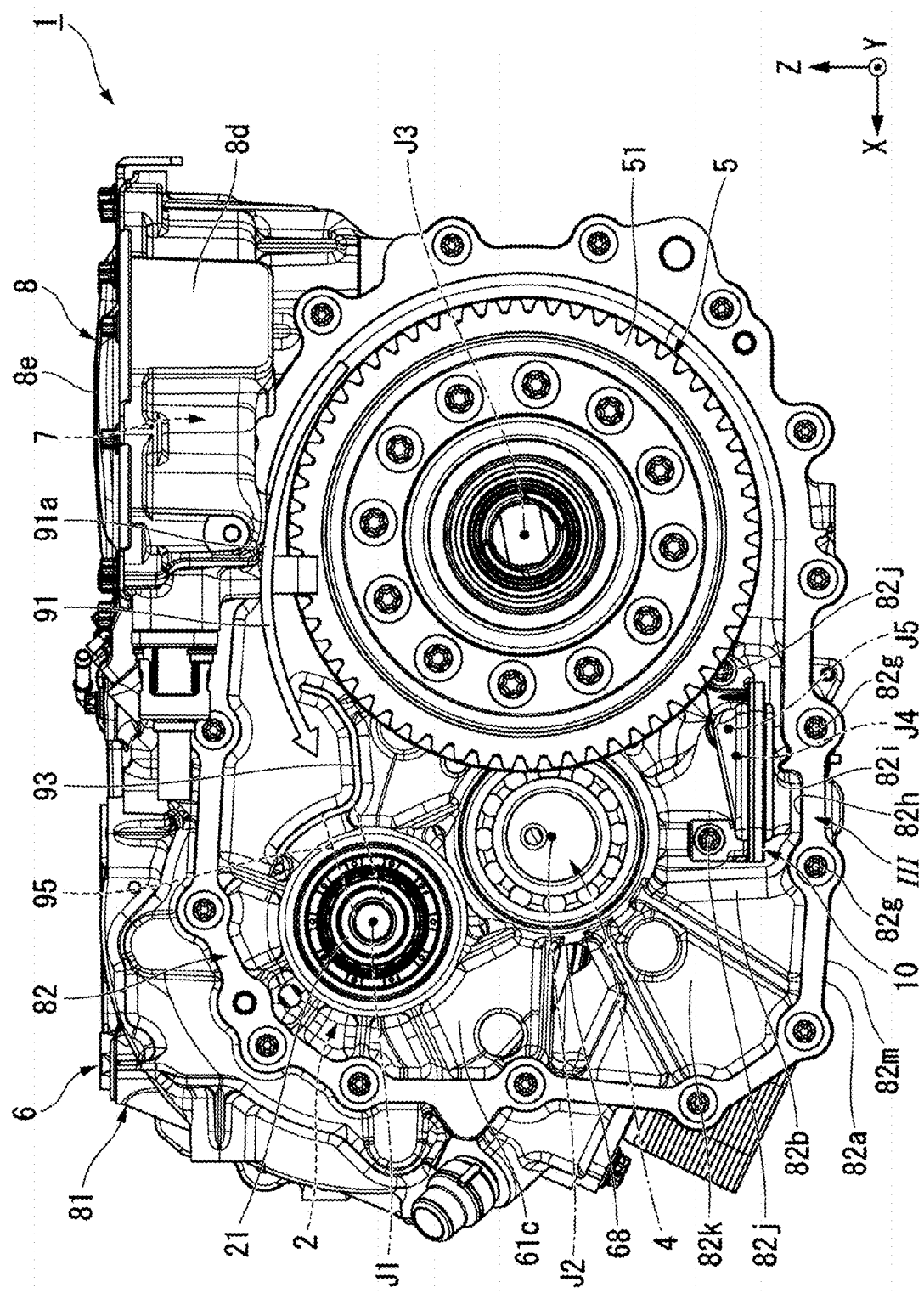
FIG. 2 is a side view showing an inside of a gear accommodation portion of a housing, in which illustration of some of the members is omitted.

The first gear 41 is fixed to the outer peripheral surface at the left end of the shaft 21. The first gear 41, together with the shaft 21, rotates about the motor axis J1. The intermediate shaft 45 extends along an intermediate axis J2. In the present example embodiment, the intermediate axis J2 is parallel to the motor axis J1. As shown in FIG. 2, in the present example embodiment, the intermediate axis J2 is positioned below the motor axis J1. The intermediate axis J2 is positioned on the rear side (−X side) relative to the motor axis J1. The intermediate shaft 45 rotates about the intermediate axis J2.

Figure 4:
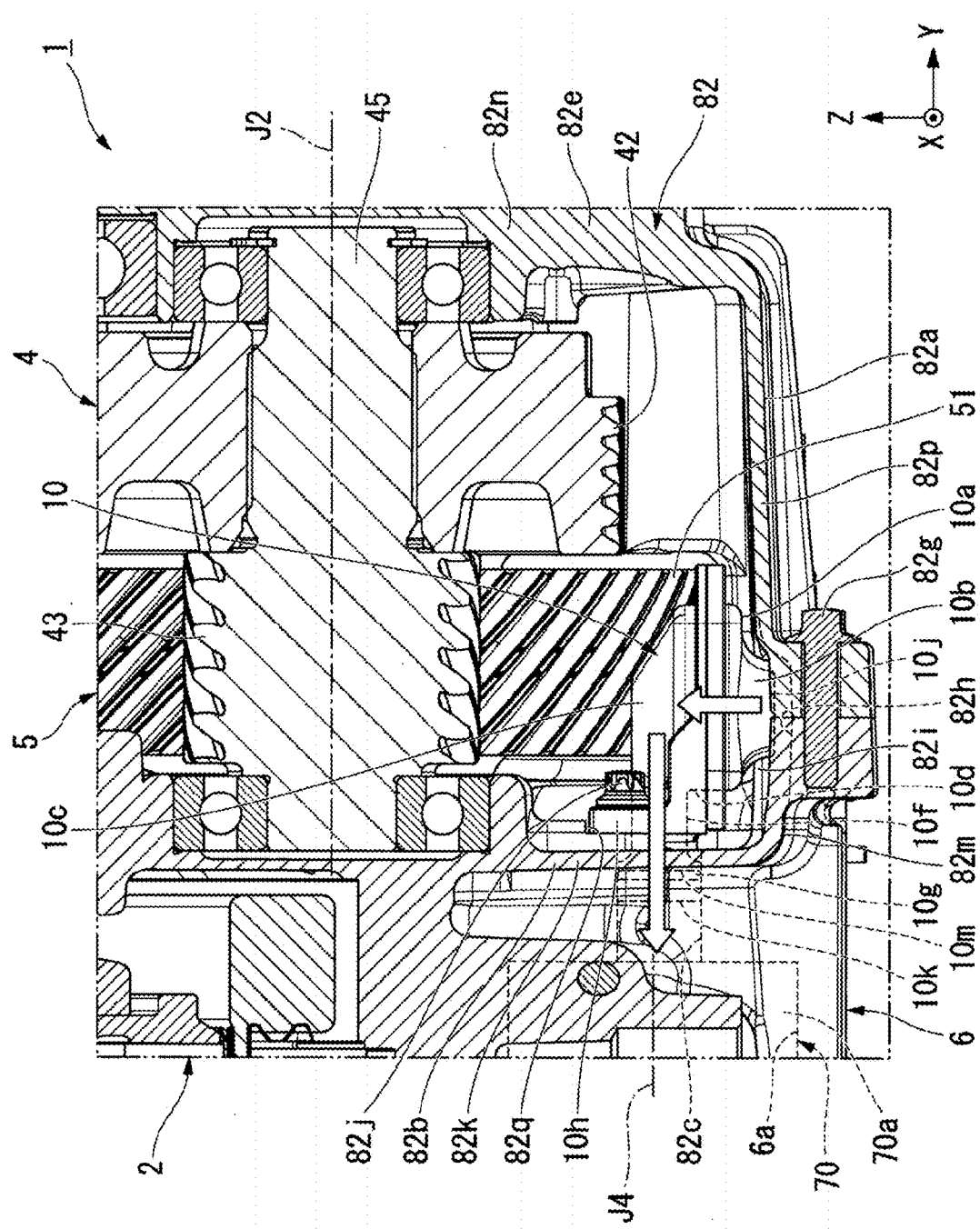
FIG. 4 is a cross-sectional view showing a IV-IV cross section of FIG. 3.

As shown in FIG. 1, the second gear 42 and the third gear 43 are connected via the intermediate shaft 45. In the present example embodiment, as shown in FIG. 4, the second gear 42 is fixed to the outer peripheral surface of the intermediate shaft 45. The third gear 43 and the intermediate shaft 45 are portions of a single member. The second gear 42 and the third gear 43 rotate about the intermediate axis J2. As shown in FIG. 1, the second gear 42 meshes with the first gear 41. The third gear 43 meshes with a ring gear 51 described later of the differential 5. The outer diameter of the second gear 42 is larger than the outer diameter of the third gear 43. In the present example embodiment, the lower end of the second gear 42 is the lowermost part of the decelerator 4.

The torque output from the motor 2 is transmitted to the differential 5 via the decelerator 4. More specifically, the torque output from the motor 2 is transmitted to the ring gear 51 of the differential 5 via the shaft 21, the first gear 41, the second gear 42, the intermediate shaft 45, and the third gear 43 in this order. The gear ratio of each gear, the number of gears, and the like can be variously changed according to the required reduction ratio. In the present example embodiment, the decelerator 4 is a parallel axis gear type decelerator in which the axis centers of the gears are disposed in parallel.

The differential 5 is connected to the decelerator 4. Thus, the differential 5 is connected to the motor 2 via the decelerator 4. The differential 5 is a device that transmits the torque output from the motor 2 to the wheels of the vehicle. The differential 5 transmits the same torque to axles 55 of the right and left wheels while absorbing the speed difference between the right and left wheels when the vehicle turns. The differential 5 rotates the axle 55 about a differential axis J3. Thus, the drive device 1 rotates the axle 55 of the vehicle.

In the present example embodiment, the differential axis J3 is parallel to the motor axis J1. That is, in the present example embodiment, the axial direction of the differential axis J3 is the same as the axial direction of the motor axis J1. As shown in FIG. 2, in the present example embodiment, the differential axis J3 is positioned on the rear side (−X side) relative to the motor axis J1 and the intermediate axis J2. The differential axis J3 is positioned below the motor axis J1. The differential axis J3 is positioned at substantially the same position as the intermediate axis J2 in the vertical direction. The differential axis J3 is positioned on a slightly upper side relative to the intermediate axis J2.

The differential 5 is positioned on the rear side (−X side) relative to the decelerator 4 inside the gear accommodation portion 82. Although not illustrated in FIG. 1 partially, the differential 5 has the ring gear 51, a gear housing, a pair of pinion gears, a pinion shaft, and a pair of side gears. That is, the differential 5 has the gear 51. The outer diameters of the gears 41, 42, and 43 included in the decelerator 4 are smaller than the outer diameter of the gear 51 included in the differential 5. As shown in FIG. 1, the ring gear 51 is a gear that rotates about the differential axis J3. That is, the differential 5 has the gear 51 that rotates about the differential axis J3. The ring gear 51 meshes with the third gear 43. Thus, the torque output from the motor 2 is transmitted to the ring gear 51 via the decelerator 4. The lower end of the ring gear 51 is positioned lower than the decelerator 4. In the present example embodiment, the lower end of the ring gear 51 is positioned in the lowermost part of the differential 5. The vertical lower end of the ring gear 51 is disposed in an oil sump P described later of the oil passage 90.

The housing 6 constitutes a part of an outer casing of the drive device 1. The housing 6 is made of metal, for example, and has conductivity. The housing 6 includes the motor accommodation portion 81, the gear accommodation portion 82, a partition wall 61c, a first reservoir 93, and an oil introduction path 95.

The motor accommodation portion 81 has a second reservoir 94. The second reservoir 94 is positioned inside the motor accommodation portion 81. The second reservoir 94 is positioned above the stator 30. The second reservoir 94 is supported from below by the stator 30, and is provided in the motor 2. The second reservoir 94 is made of resin, for example. In the present example embodiment, the second reservoir 94 is in the shape of an upward opening gutter.

As shown in FIG. 2, the gear accommodation portion 82 extends in the front-rear direction (X axis direction). The gear accommodation portion 82 projects rearward from the left end of the motor accommodation portion 81. As shown in FIGS. 1 to 4, the gear accommodation portion 82 includes a first side wall portion 82b, a wall hole 82c, a first hole portion 82d, a second side wall portion 82e, a second hole portion 82f, a plurality of screws 82g, a suction recess portion 82h, a projection portion 82i, and a fixing screw 82j.

Figure 3:
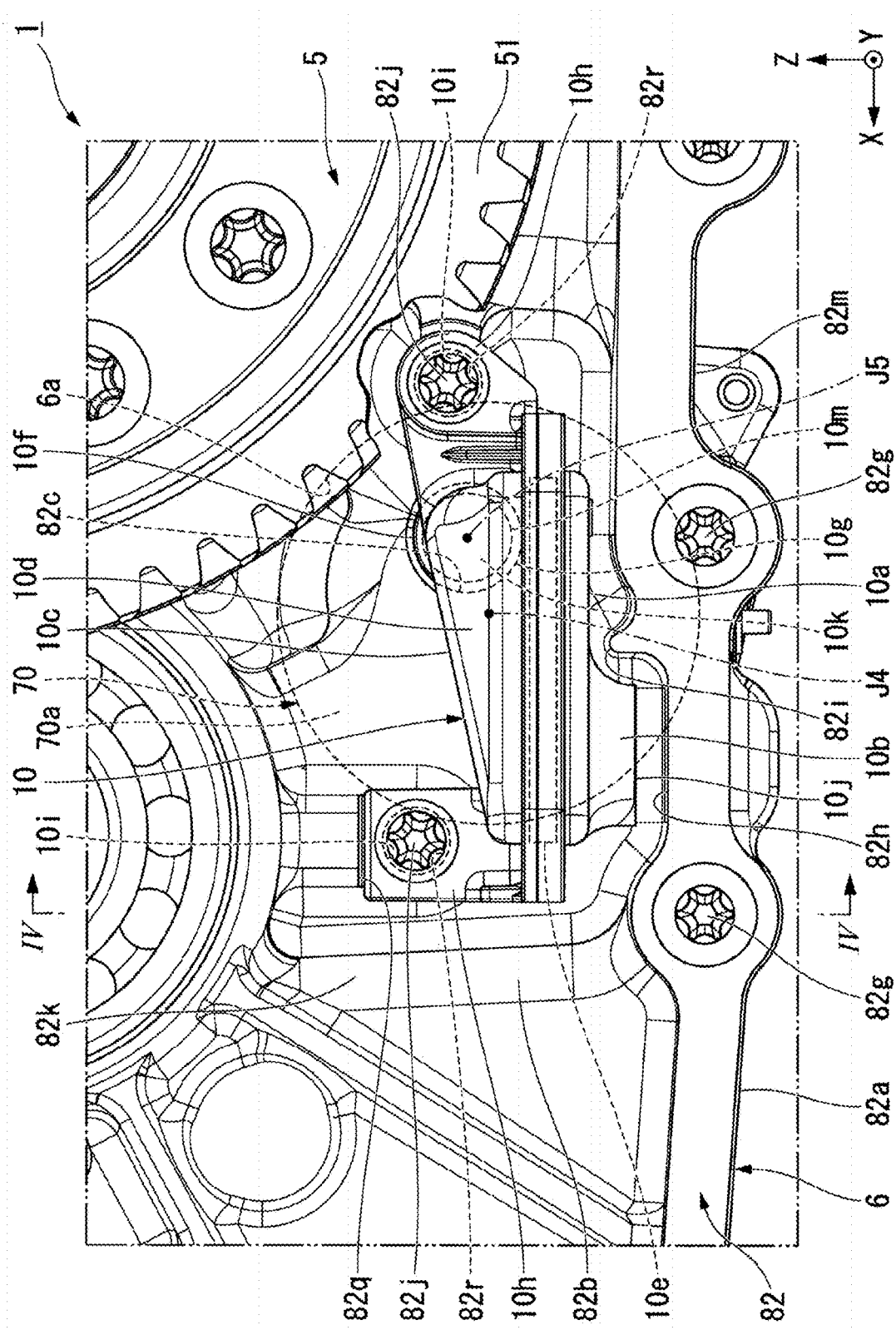
FIG. 3 is an enlarged view of a III part of FIG. 2.

The strainer 10 is attached to the first side wall portion 82b. As shown in FIGS. 2 to 4, the first side wall portion 82b includes a first vertical wall 82k, a screw hole 82r, a detent portion 82q, and a first bottom wall 82m. The first vertical wall 82k expands in a direction orthogonal to the axial direction (Y axis direction). The pair of wall surfaces of the first vertical wall 82k face the right-left direction. The first vertical wall 82k is opposed to the ring gear 51 from right (−Y side). That is, the first side wall portion 82b is opposed to the differential 5 from one axial side of the differential axis J3.

As shown in FIG. 3, the screw hole 82r is disposed on the first vertical wall 82k. The screw hole 82r is disposed below the intermediate axis J2 and the differential axis J3. The screw hole 82r opens on a wall surface facing the left side (+Y side) of the first vertical wall 82k. The screw hole 82r extends in the axial direction (Y axis direction). The screw hole 82r is a bottomed stop hole. The screw hole 82r has a female screw portion on the inner peripheral surface of the screw hole 82r. A plurality of screw holes 82r are provided on the first vertical wall 82k. In the present example embodiment, two screw holes 82r are provided. The two screw holes 82r are disposed apart from each other in the front-rear direction (X axis direction).

The detent portion 82q is disposed on the first vertical wall 82k. The detent portion 82q is disposed below the intermediate axis J2 and the differential axis J3. In the present example embodiment, the detent portion 82q is positioned immediately below the intermediate axis J2. The detent portion 82q is provided on a wall surface facing the left side (+Y side) of the first vertical wall 82k. The detent portion 82q has a downward facing surface. The downward facing surface of the detent portion 82q expands in a direction orthogonal to the vertical direction.

As shown in FIGS. 2 to 4, the first bottom wall 82m expands in a direction orthogonal to the vertical direction (Z axis direction). The pair of wall surfaces of the first bottom wall 82m face the vertical direction. The first bottom wall 82m is connected to the lower end of the first vertical wall 82k. The first bottom wall 82m is opposed to the ring gear 51 from below (−Z side). That is, the first side wall portion 82b is opposed to the differential 5 from below. The first bottom wall 82m constitutes a bottom portion of the first side wall portion 82b. The first bottom wall 82m constitutes a portion on one axial side (−Y side) of a bottom portion 82a of the gear accommodation portion 82. In the present example embodiment, the first bottom wall 82m is positioned lower toward the other axial side (+Y side).

As shown in FIGS. 3 and 4, the wall hole 82c penetrates the first vertical wall 82k in the axial direction (Y axis direction). The wall hole 82c has a circular hole shape extending in the axial direction. The wall hole 82c opens on the first vertical wall 82k. That is, the wall hole 82c opens on the first side wall portion 82b. The wall hole 82c is positioned between the two screw holes 82r in the front-rear direction (X axis direction). The wall hole 82c provides communication between the strainer 10 and the oil pump 70.

As shown in FIG. 1, the first hole portion 82d penetrates the first side wall portion 82b in the axial direction. The first hole portion 82d penetrates the first vertical wall 82k in the axial direction. The first hole portion 82d is a circular hole centered on the differential axis J3. The axle 55 passes through the first hole portion 82d.

As shown in FIG. 4, the second side wall portion 82e includes a second vertical wall 82n and a second bottom wall 82*p*. The second vertical wall 82*n* expands in a direction orthogonal to the axial direction (Y axis direction). The pair of wall surfaces of the second vertical wall 82*n* face the right-left direction. The second vertical wall 82*n* is opposed to the ring gear 51 from left side (+Y side). That is, the second side wall portion 82*e* is opposed to the differential 5 from the other axial side of the differential axis J3.

The second bottom wall 82*p* expands in a direction orthogonal to the vertical direction (Z axis direction). The pair of wall surfaces of the second bottom wall 82*p* face the vertical direction. The second bottom wall 82*p* is connected to the lower end of the second vertical wall 82*n*. The second bottom wall 82*p* is opposed to the ring gear 51 from below (−Z side). That is, the second side wall portion 82*e* is opposed to the differential 5 from below. The second bottom wall 82*p* constitutes a bottom portion of the second side wall portion 82*e*. The second bottom wall 82*p* constitutes a portion on the other axial side (+Y side) of the bottom portion 82*a* of the gear accommodation portion 82. In the present example embodiment, the second bottom wall 82*p* is positioned lower toward one axial side (−Y side).

As shown in FIG. 1, the second hole portion 82*f* penetrates the second side wall portion 82*e* in the axial direction. The second hole portion 82*f* penetrates the second vertical wall 82*n* in the axial direction. The second hole portion 82*f* is a circular hole centered on the differential axis J3. The axle 55 passes through the second hole portion 82*f*.

As shown in FIGS. 2 to 4, the screw 82*g* is, for example, a bolt. The screw 82*g* extends in the axial direction. The plurality of screws 82*g* fix the first side wall portion 82*b* and the second side wall portion 82*e* in the axial direction (Y axis direction) of the differential axis J3. The plurality of screws 82*g* are arranged at intervals from each other in a direction orthogonal to the axial direction. The plurality of screws 82*g* are arranged along the opening on the left side (+Y side) of the first side wall portion 82*b* and the opening on the right side (−Y side) of the second side wall portion 82*e*. The plurality of screws 82*g* include a plurality of screws 82*g* arranged on the bottom portion 82*a* of the gear accommodation portion 82. The plurality of screws 82*g* arranged on the bottom portion 82*a* are arranged at intervals from each other in the front-rear direction (X axis direction).

The suction recess portion 82*h* is disposed in at least any of the bottom portion of the first side wall portion 82*b* and the bottom portion of the second side wall portion 82*e* and is recessed downward in the vertical direction. As shown in FIG. 2, when viewed from the axial direction of the differential axis J3, the front-rear direction position of the suction recess portion 82*h* is between the front-rear direction position of the motor axis J1 and the front-rear direction position of the differential axis J3. In the present example embodiment, the suction recess portion 82*h* is positioned substantially immediately below the intermediate axis J2. The suction recess portion 82*h* is provided between a pair of screws 82*g* adjacent in the horizontal direction when viewed from the axial direction of the differential axis J3. The suction recess portion 82*h* is disposed between a pair of screws 82*g* adjacent in the front-rear direction (X axis direction) at the bottom portion 82*a* of the gear accommodation portion 82. The suction recess portion 82*h* constitutes a part of the oil sump P described later of the oil passage 90.

As shown in FIG. 4, in the present example embodiment, the suction recess portion 82*h* is disposed across the first bottom wall 82*m* and the second bottom wall 82*p*. That is, the suction recess portion 82*h* is disposed across the bottom portion of the first side wall portion 82*b* and the bottom portion of the second side wall portion 82*e*. The suction recess portion 82*h* is positioned at least at an end of the left side (+Y side) of the first bottom wall 82*m*. In the present example embodiment, the suction recess portion 82*h* is disposed throughout substantially the entire region of the first bottom wall 82*m* in the right-left direction. The suction recess portion 82*h* is recessed downward from an upward facing wall surface of the first bottom wall 82*m*. The suction recess portion 82*h* is positioned at an end of the right side (−Y side) of the second bottom wall 82*p*. The suction recess portion 82*h* is recessed downward from an upward facing wall surface of the second bottom wall 82*p*.

The projection portion 82*i* is disposed in at least any of the bottom portion of the first side wall portion 82*b* and the bottom portion of the second side wall portion 82*e* and projects upward in the vertical direction. As shown in FIG. 2, the projection portion 82*i* is disposed on the rear side (−X side) of the suction recess portion 82*h*. In the present example embodiment, the projection portion 82*i* is disposed adjacent to the suction recess portion 82*h*. When viewed from the axial direction of the differential axis J3, the front-rear direction position of the projection portion 82*i* is between the front-rear direction position of the vertical lower end of the ring gear 51 of the differential 5 and the front-rear direction position of the suction recess portion 82*h*. That is, when viewed from the axial direction of the differential axis J3, the horizontal position of the projection portion 82*i* is between the horizontal position of the vertical lower end of the gear (ring gear) 51 of the differential 5 and the horizontal position of the suction recess portion 82*h*. In the present example embodiment, the projection portion 82*i* is positioned between the pair of screws 82*g* adjacent in the front-rear direction (X axis direction) at the bottom portion 82*a* of the gear accommodation portion 82.

The projection portion 82*i* has a rib shape extending in the axial direction (Y axis direction). As shown in FIG. 4, in the present example embodiment, the projection portion 82*i* is disposed across the first bottom wall 82*m* and the second bottom wall 82*p*. That is, the projection portion 82*i* is disposed across the bottom portion of the first side wall portion 82*b* and the bottom portion of the second side wall portion 82*e*. The projection portion 82*i* has a portion overlapping the suction recess portion 82*h* as viewed in the front-rear direction (X axis direction). In the present example embodiment, the projection portion 82*i* is disposed throughout substantially the entire region of the first bottom wall 82*m* in the right-left direction. The projection portion 82*i* projects upward from the upward facing wall surface of the first bottom wall 82*m*. The projection portion 82*i* is positioned at an end of the right side (−Y side) of the second bottom wall 82*p*. The projection portion 82*i* projects upward from the upward facing wall surface of the second bottom wall 82*p*.

As shown in FIGS. 3 and 4, the fixing screw 82*j* fixes an attachment portion 10*h* described later of the strainer 10 to the first side wall portion 82*b*. The fixing screw 82*j* fixes the strainer 10 to a wall surface facing the left side (+Y side) of the first vertical wall 82*k*. The fixing screw 82*j* extends in the axial direction (Y axis direction). The fixing screw 82*j* has a male screw portion on the outer peripheral surface of the fixing screw 82*j*. A plurality of fixing screws 82*j* are provided. In the present example embodiment, two fixing screws 82*j* are provided. Each fixing screw 82*j* is screwed into each screw hole 82*r*.

As shown in FIG. 1, the partition wall 61*c* axially partitions the inside of the motor accommodation portion 81 and the inside of the gear accommodation portion 82. The partition wall 61*c* has a partition wall opening 68 that axially penetrates the partition wall 61c. The inside of the motor accommodation portion 81 and the inside of the gear accommodation portion 82 communicate with each other through the partition wall opening 68.

As shown in FIGS. 1 and 2, the first reservoir 93 is disposed within the gear accommodation portion 82. As shown in FIG. 2, the first reservoir 93 is positioned above the motor axis J1, the intermediate axis J2, and the differential axis J3. The first reservoir 93 opens upward. That is, the first reservoir 93 temporarily stores the oil O scooped by the ring gear 51.

The oil introduction path 95 extends from the bottom portion of the first reservoir 93 toward the shaft 21. The oil introduction path 95 guides the oil O accumulated in the first reservoir 93 into the hollow portion 22 from the left end of the shaft 21. In the present example embodiment, the oil introduction path 95 extends linearly. The oil introduction path 95 is positioned lower from the first reservoir 93 toward the shaft 21 along the front-rear direction (X axis direction).

The oil O is accommodated in the motor accommodation portion 81 and the gear accommodation portion 82. That is, the oil O is accommodated in the housing 6. As shown in FIG. 1, the drive device 1 is provided with the oil passage 90 for circulating the oil O inside the housing 6. That is, the oil passage 90 for the oil O is provided in the housing 6. The oil passage 90 is a path for supplying the oil O from the oil sump P described later to the motor 2 and guiding the oil O to the oil sump P again. The oil passage 90 is provided across the inside of the motor accommodation portion 81 and the inside of the gear accommodation portion 82.

In this description, the "oil passage 90" means the path for the oil O. Therefore, the "oil passage 90" is a concept including not only a "flow path" that creates a steady unidirectional flow of the oil O, but also a path for temporarily retaining the oil O and a path for the oil O to drip off. The path for temporarily retaining the oil O includes, for example, the oil sump P, the reservoirs 93 and 94 that store the oil O.

The oil O is used for lubrication of the decelerator 4 and the differential 5. The oil O is used for cooling the motor 2. As the oil O, an oil equivalent to an automatic transmission fluid (ATF) having a relatively low viscosity is preferably used in order to perform the function of lubricating oil and cooling oil. The oil passage 90 includes the oil sump P, a first oil passage 91, and a second oil passage 92.

The oil O is accumulated in the oil sump P. The oil sump P is provided in a lower region inside the gear accommodation portion 82. The oil sump P is disposed at the bottom portion of the gear accommodation portion 82. That is, the oil sump P is disposed inside the housing 6. An oil surface S of the oil sump P is positioned upper than the lower end of the ring gear 51. Thus, the lower end of the ring gear 51 is immersed in the oil O in the gear accommodation portion 82. The oil surface S of the oil sump P is positioned lower than the differential axis J3 and the axle 55.

The oil O in the oil sump P is sent from the inside of the gear accommodation portion 82 to the inside of the motor accommodation portion 81 through the first oil passage 91 and the second oil passage 92. The oil O sent to the inside of the motor accommodation portion 81 accumulates in a lower region inside the motor accommodation portion 81. At least a part of the oil O accumulated in the motor accommodation portion 81 moves to the gear accommodation portion 82 through the partition wall opening 68 and returns to the oil sump P. As shown in FIG. 1, the bottom portion 82a of the gear accommodation portion 82 has a portion positioned below the bottom portion 81a of the motor accommodation portion 81. Therefore, the oil O sent from the inside of the gear accommodation portion 82 into the motor accommodation portion 81 easily flows into the gear accommodation portion 82 through the partition wall opening 68.

Note that when "the oil O is accommodated in a certain part" in the present description, the oil O is only required to be positioned in a certain part at least in part when the motor 2 is being driven, and the oil O may not be positioned in a certain part when the motor 2 is stopped. For example, when the oil O is accommodated in the motor accommodation portion 81 in the present example embodiment, the oil O is only required to be positioned in the motor accommodation portion 81 at least in part when the motor 2 is being driven, and the oil O in the motor accommodation portion 81 may entirely be moved to the gear accommodation portion 82 through the partition wall opening 68 when the motor 2 is stopped. A part of the oil O sent to the inside of the motor accommodation portion 81 through the oil passage 90 may remain inside the motor accommodation portion 81 in a state where the motor 2 is stopped.

In the present description, when "the lower end of the ring gear 51 is immersed in the oil O in the gear accommodation portion 82", the lower end of the ring gear 51 is only required to be immersed in the oil O in the gear accommodation portion 82 at least in part when the motor 2 is being driven, and the lower end of the ring gear 51 may not be immersed in the oil O in the gear accommodation portion 82 in part when the motor 2 is being driven or the motor 2 is stopped. For example, as a result of the oil O in the oil sump P being sent to the inside of the motor accommodation portion 81 through the first oil passage 91 and the second oil passage 92, the oil surface S of the oil sump P may be lowered, and the lower end of the ring gear 51 may be temporarily not immersed in the oil O.

The first oil passage 91 and the second oil passage 92 each circulate the oil O inside the housing 6. The first oil passage 91 has a scoop path 91a, a shaft supply path 91b, an in-shaft path 91c, and an in-rotor path 91d. The first reservoir 93 is provided in the path of the first oil passage 91.

As shown in FIGS. 1 and 2, the scoop path 91a is a path for scooping the oil O from the oil sump P by rotation of the ring gear 51 of the differential 5 and receiving the oil O in the first reservoir 93. When the oil surface S of the oil sump P is high immediately after the motor 2 is driven, the first reservoir 93 also receives the oil O scooped by the second gear 42 and the third gear 43 in addition to the ring gear 51.

As shown in FIG. 1, the shaft supply path 91b guides the oil O from the first reservoir 93 to the hollow portion 22 of the shaft 21. The shaft supply path 91b includes the oil introduction path 95. The in-shaft path 91c is a path for the oil O to pass through the hollow portion 22 of the shaft 21. The in-rotor path 91d is a path for the oil O to pass through the inside of the rotor body 24 from the communication hole 23 of the shaft 21 and scatters to the stator 30.

In the in-shaft path 91c, centrifugal force is applied to the oil O inside the rotor 20 due to the rotation of the rotor 20. Thus, the oil O is continuously scattered radially outward from the rotor 20. With the scattering of the oil O, the path inside the rotor 20 becomes negative pressure, and the oil O accumulated in the first reservoir 93 is sucked into the rotor 20 through the oil introduction path 95, and the path inside the rotor 20 is filled with the oil O.

The oil O having reached the stator 30 absorbs heat from the stator 30 by exchanges heat with the stator 30. The oil O having cooled the stator 30 is drips to the lower side and accumulated in the lower region in the motor accommodation portion 81. The oil O accumulated in the lower region in the motor accommodation portion 81 moves to the gear accommodation portion 82 through the partition wall opening 68 provided in the partition wall 61c. As described above, the first oil passage 91 supplies the oil O to the rotor 20 and the stator 30.

In the second oil passage 92, the oil O is lifted up from the oil sump P to the upper side of the stator 30 and supplied to the stator 30. That is, the second oil passage 92 supplies the oil O from the upper side of the stator 30 to the stator 30. The second oil passage 92 is provided with the strainer 10, the oil pump 70, a cooler 97, and the second reservoir 94. The second oil passage 92 has a first flow path 92a, a second flow path 92b, and a third flow path 92c.

The first flow path 92a is a suction path 92a connecting the oil sump P and the oil pump 70. That is, the oil passage 90 has the suction path 92a. The first flow path 92a passes through inside the strainer 10. The first flow path 92a has a portion extending in the vertical direction and a portion extending in a direction intersecting the vertical direction. In the first flow path 92a, the portion extending in a direction intersecting the vertical direction is a horizontally extending portion in the present example embodiment. The orientation of the first flow path 92a is changed inside the strainer 10. The configuration of the strainer 10 will be described later.

The second flow path 92b and the third flow path 92c are provided on the wall portion of the housing 6. The second flow path 92b connects the oil pump 70 and the cooler 97. The second flow path 92b is provided in the bottom portion 81a of the motor accommodation portion 81. The third flow path 92c extends upward from the cooler 97. The third flow path 92c is provided in the wall portion of the motor accommodation portion 81. Although not illustrated, the third flow path 92c has a supply port opening inside the motor accommodation portion 81 above the stator 30. This supply port supplies the oil O to the inside of the motor accommodation portion 81.

As shown in FIGS. 1, 3, and 4, the oil pump 70 is provided in a lower portion of the housing 6. That is, the oil pump 70 is provided in the housing 6. The first flow path 92a and the second flow path 92b are connected to the oil pump 70. The first flow path 92a and the second flow path 92b communicate via an internal flow path of the oil pump 70. A part of the second oil passage 92 is disposed in the oil pump 70. That is, a part of the oil passage 90 is disposed in the oil pump 70.

The oil pump 70 is an electric oil pump driven by electricity. A first central axis J4, which is the central axis of the oil pump 70, extends in a direction intersecting the vertical direction. The first central axis J4 is a central axis of a motor not illustrated disposed inside the oil pump 70, for example. In the present example embodiment, the first central axis J4 extends in the horizontal direction. The first central axis J4 extends in the axial direction (Y axis direction). That is, the oil pump 70 is provided in the transverse posture at the bottom portion of the housing 6. The first central axis J4 is parallel to the motor axis J1. The axial direction of the first central axis J4 is the same as the axial directions of each of the motor axis J1, the intermediate axis J2, and the differential axis J3. The oil pump 70 is disposed to overlap the wall hole 82c when viewed from the axial direction.

The oil pump 70 has an embedded portion 70a embedded in the bottom portion of the housing 6. The embedded portion 70a is inserted from right side (−Y side) into a recess 6a provided in the bottom portion of the housing 6. The recess 6a has a circular hole shape extending in the axial direction (Y axis direction) and opens to the right side at the bottom portion of the housing 6. That is, the oil pump 70 is inserted into the recess 6a from the axial direction. As shown in FIG. 1, the oil pump 70 sucks up the oil O from the oil sump P via the first flow path (suction path) 92a, and supplies the oil O to the motor 2 via the second flow path 92b, the cooler 97, the third flow path 92c, and the second reservoir 94.

The oil pump 70 is electrically connected to the inverter 7 via a harness member not illustrated. The harness member is disposed outside the housing 6 and outside the inverter case 8. In the present example embodiment, the harness member is routed along a part of a cooling water piping 97j.

The cooler 97 cools the oil O passing through the second oil passage 92. The second flow path 92b and the third flow path 92c are connected to the cooler 97. The second flow path 92b and the third flow path 92c communicate via an internal flow path of the cooler 97. The cooling water piping 97j that passes cooling water cooled by a radiator not illustrated is connected to the cooler 97. The oil O passing through inside the cooler 97 is cooled by heat exchange with the cooling water passing through the cooling water piping 97j. A part of the path of the cooling water piping 97j is disposed in the inverter case 8. The cooling water passing through the cooling water piping 97j cools the inverter 7.

The second reservoir 94 constitutes a part of the second oil passage 92. The second reservoir 94 stores the oil O. In the present example embodiment, the second reservoir 94 stores the oil O supplied into the motor accommodation portion 81 via the third flow path 92c. The second reservoir 94 has a supply port 94a for supplying the oil O to the coil ends 33a and 33b. Thus, the oil O stored in the second reservoir 94 can be supplied to the stator 30.

The oil O supplied from the second reservoir 94 to the stator 30 drips to the lower side and accommodated in the lower region in the motor accommodation portion 81. The oil O accumulated in the lower region in the motor accommodation portion 81 moves to the gear accommodation portion 82 through the partition wall opening 68 provided in the partition wall 61c. As described above, the second oil passage 92 supplies the oil O to the stator 30.

The strainer 10 is made of resin, for example. The strainer 10 is provided inside the housing 6. The strainer 10 is disposed at the bottom portion of the gear accommodation portion 82. As shown in FIGS. 2 and 4, the strainer 10 is disposed immediately below the gear (third gear) 43 of the decelerator 4. The strainer 10 is disposed immediately below the intermediate axis J2. In FIG. 2, illustration of the gear 43 and the like is omitted. According to the present example embodiment, the strainer 10 is provided in a dead space positioned immediately below the gear 43 of the decelerator 4 in the gear accommodation portion 82. Therefore, the space in the gear accommodation portion 82 can be effectively used, and the gear accommodation portion 82 can be made compact.

As shown in FIG. 1, a part of the second oil passage 92 is disposed in the strainer 10. That is, a part of the oil passage 90 is disposed in the strainer 10. Specifically, a part of the first flow path 92a is disposed in the strainer 10. The strainer 10 is positioned in the suction path 92a. The strainer 10 is a substantially rectangular cuboid. The strainer 10 has an outer dimension in the vertical direction (Z axis direction) smaller than an outer dimension in the right-left direction (Y axis direction) and an outer dimension in the front-rear direction (X axis direction). The strainer 10 has an internal space (chamber) through which the oil O flows. As shown in FIGS. 3 and 4, the strainer 10 includes a bottom wall portion 10a, a top wall portion 10c, a peripheral wall portion 10d, a discharge tube 10f, an elastic ring 10g, a filter 10e, an attachment portion 10h, and an attachment hole 10i.

The bottom wall portion 10a is disposed away upward from the first bottom wall 82m and the second bottom wall 82p. The bottom wall portion 10a is opposed to the first bottom wall 82m and the second bottom wall 82p from above. That is, the bottom wall portion 10a is opposed to the bottom portion of the gear accommodation portion 82 from above. The bottom wall portion 10a has a portion expanding in a direction orthogonal to the vertical direction. The bottom wall portion 10a has a suction tube 10b.

The suction tube 10b has a tubular shape projecting downward from the bottom wall portion 10a. The suction tube 10b is disposed in a portion on the front side (+X side) of the bottom wall portion 10a. The lower end of the suction tube 10b is disposed in the suction recess portion 82h. The outside and the internal space of the strainer 10 communicate with each other through the inside of the suction tube 10b. The suction tube 10b has a suction port 10j. The bottom wall portion 10a is provided with the suction port 10j. That is, the strainer 10 has the suction port 10j. The suction port 10j opens downward in the vertical direction. The suction port 10j is disposed in the suction recess portion 82h. The suction port 10j sucks the oil O from the suction recess portion 82h. That is, the suction port 10j sucks the oil O from the oil sump P.

According to the present example embodiment, for example, even if the gear (ring gear) 51 of the differential 5 scoops up the oil O in the oil sump P and the oil surface S of the oil O ripples, the flow of the oil O in the suction recess portion 82h can be suppressed to be small. Therefore, it is possible to stably suck the oil O from the suction port 10j. Even if the ring gear 51 scoops up the oil O and generates bubbles in the oil O, the bubbles are suppressed from reaching the suction recess portion 82h. Therefore, the strainer 10 is prevented from sucking the oil O containing bubbles (air). This stabilizes the lubricating effect and the cooling effect by the oil O flowing through the second oil passage 92. In the present example embodiment, since the suction recess portion 82h is provided between the pair of screws 82g, the space at the bottom portion of the gear accommodation portion 82 can be effectively used, and the depth and capacity of the suction recess portion 82h can be easily secured. As a result, the vertical outer shape of the gear accommodation portion 82 is suppressed to be small, and the housing 6 can be made compact.

In the present example embodiment, even if the ring gear 51 scoops up the oil O in the oil sump P and the oil surface S of the oil O ripples, the flow of the oil O in the suction recess portion 82h can be suppressed to be small by the projection portion 82i positioned between the lower end of the ring gear 51 and the suction recess portion 82h. Therefore, it is possible to stably suck the oil O from the suction port 10j. Even if the ring gear 51 scoops up the oil O and generates bubbles in the oil O, the bubbles are suppressed from reaching the suction recess portion 82h by the projection portion 82i. Therefore, the strainer 10 is prevented from sucking the oil O containing bubbles.

The top wall portion 10c is disposed vertically above the bottom wall portion 10a at a distance from the bottom wall portion 10a. The top wall portion 10c is positioned upper toward the rear side (−X side). The peripheral wall portion 10d connects the bottom wall portion 10a and the top wall portion 10c. The discharge tube 10f is connected to the peripheral wall portion 10d. The discharge tube 10f has a cylindrical shape.

A second central axis J5, which is the central axis of the discharge tube 10f, extends in a direction intersecting the vertical direction. In the present example embodiment, the second central axis J5 extends in the horizontal direction. The second central axis J5 extends in the axial direction (Y axis direction). The second central axis J5 is parallel to the motor axis J1. The axial direction of the second central axis J5 is the same as the axial directions of each of the motor axis J1, the intermediate axis J2, the differential axis J3, and the first central axis J4. That is, the discharge tube 10f extends in the axial direction. In the present example embodiment, the second central axis J5 is positioned on the rear side (−X side) relative to the first central axis J4. The second central axis J5 is positioned above the first central axis J4.

The discharge tube 10f projects rightward (−Y side) from the peripheral wall portion 10d. The discharge tube 10f is disposed in a portion of the peripheral wall portion 10d on the rear side (−X side). The discharge tube 10f is inserted into the wall hole 82c. A discharge port 10k is disposed in the discharge tube 10f. That is, the strainer 10 has the discharge port 10k. The discharge port 10k discharges the oil O toward the oil pump 70. The discharge port 10k opens in a direction intersecting the vertical direction toward the oil pump 70. In the present example embodiment, the discharge port 10k opens in the horizontal direction toward the oil pump 70. The discharge port 10k opens in the axial direction (Y axis direction) toward the oil pump 70. The discharge port 10k opens rightward (−Y side).

According to the present example embodiment, the suction path 92a changes, inside the strainer 10, its orientation from the vertical direction to a direction intersecting the vertical direction. That is, the oil O sucked from the oil sump P to the upper side in the vertical direction by the suction port 10j of the strainer 10 is discharged from the discharge port 10k to the oil pump 70 toward a direction intersecting the vertical direction, i.e., toward the horizontal direction in the present example embodiment. That is, the strainer 10 can change the orientation of the suction path 92a while trapping foreign substances or the like in the oil O. Therefore, the path (suction path) 92a for sending the oil O from the oil sump P to the oil pump 70 in the oil passage 90 can be provided with a simple configuration and in a small space. Thus, the drive device 1 has a simple and compact structure.

As shown in FIG. 3, when viewed from the axial direction of the second central axis J5, the discharge port 10k and the suction port 10j are disposed to be shifted in the horizontal direction. In the present example embodiment, the discharge port 10k and the suction port 10j are disposed to be shifted in the front-rear direction (X axis direction). Specifically, the horizontal position of the discharge port 10k is on the rear side (−X side) relative to the horizontal position of the suction port 10j. In the present example embodiment, the central axis of the suction port 10j, i.e., the central axis of the suction tube 10b, and the central axis of the discharge port 10k, i.e., the second central axis J5 of the discharge tube 10f are disposed at positions twisted with respect to each other. Therefore, for example, as in the present example embodiment, even when the screw 82g is disposed below the discharge port 10k and it is difficult to provide the suction port 10j below (immediately below) the discharge port 10k, the suction port 10j can be easily disposed at a position (suction recess portion 82h) in the oil sump P where the oil O is easily sucked. In addition, the suction port 10j can be disposed away from the ring gear 51 in the horizontal direction. Therefore, the strainer 10 can stably suck the oil O from the suction port 10j.

In the present example embodiment, the top wall portion 10c is positioned vertically upward from the suction port 10j toward the discharge tube 10f along the horizontal direction. Specifically, the top wall portion 10c extends obliquely upward from the suction port 10j toward the discharge tube 10f along the front-rear direction (X axis direction). Therefore, the oil O is guided along the top wall portion 10c from the suction port 10j toward the discharge port 10k in the strainer 10, and hence the oil O easily flows smoothly. Since the oil O smoothly flows through the suction path 92a, the oil O efficiently circulates in the oil passage 90.

The discharge tube 10f has a groove portion 10m. The groove portion 10m is recessed from the outer peripheral surface of the discharge tube 10f and extends along around the second central axis J5. The groove portion 10m is an annular groove centered on the second central axis J5. The elastic ring 10g is fitted to the outer peripheral surface of the discharge tube 10f. The elastic ring 10g is disposed in the groove portion 10m. The elastic ring 10g is elastically deformable. The elastic ring 10g is a seal member such as an O-ring, for example. The elastic ring 10g comes into contact with the inner peripheral surface of the wall hole 82c throughout the entire circumference around the second central axis J5. According to the present example embodiment, the elastic ring 10g seals between the outer peripheral surface of the discharge tube 10f and the inner peripheral surface of the wall hole 82c. As a result, for example, the oil O containing metal powder or the like accumulated in the oil sump P can be suppressed from flowing out to the oil pump 70 and its downstream members, i.e., the bearings 26 and 27, the coil ends 33a and 33b of the stator 30, and the like through between the discharge tube 10f and the wall hole 82c. Therefore, it is possible to suppress a lock due to metal powder meshing of the gear of the oil pump 70, a lock due to metal powder meshing of the bearings 26 and 27 and the like, a short circuit of the coil ends 33a and 33b due to metal powder, and the like. In addition, by disposing the elastic ring 10g in the groove portion 10m, positional displacement of the elastic ring 10g is suppressed, and the function of the elastic ring 10g is stabilized.

The filter 10e is provided inside the strainer 10 and is positioned between the suction port 10j and the discharge port 10k. The filter 10e is disposed between the bottom wall portion 10a and the top wall portion 10c. The filter 10e expands in a direction orthogonal to the vertical direction, for example. The filter 10e covers the suction port 10j from above. The filter 10e is, for example, porous.

The attachment portion 10h comes into contact with the first side wall portion 82b. The attachment portion 10h comes into contact with a wall surface facing the left side (+Y side) of the first vertical wall 82k. The attachment portion 10h is disposed at the end on the right side (−Y side) of the strainer 10. In the present example embodiment, the attachment portion 10h has a plate shape. A pair of plate surfaces of the attachment portion 10h face the axial direction (Y axis direction). A plurality of attachment portions 10h are provided. In the present example embodiment, two attachment portions 10h are provided. The two attachment portions 10h include an attachment portion 10h disposed at the end of the front side (+X side) of the strainer 10 and an attachment portion 10h disposed at the end of the rear side (−X side) of the strainer 10. That is, the two attachment portions 10h are disposed apart from each other in the front-rear direction (X axis direction).

Of the two attachment portions 10h, the attachment portion 10h disposed at the front end of the strainer 10 is opposed to and able to contact the detent portion 82q from below. In other words, the detent portion 82q is opposed to and able to contact the attachment portion 10h from above. Specifically, the detent portion 82q is opposed to the attachment portion 10h and able to contact the attachment portion 10h around the axis of the second central axis J5. In the present example embodiment, when the strainer 10 is attached to the first side wall portion 82b, the discharge tube 10f is inserted into the wall hole 82c, and the strainer 10 is rotated about the second central axis J5 to bring the attachment portion 10h into contact with the detent portion 82q, whereby the strainer 10 can be easily aligned. Therefore, the attaching work of the strainer 10 is easy. In addition, the position of the suction port 10j can be stabilized with respect to the oil sump P, specifically, with respect to the suction recess portion 82h.

The attachment hole 10i penetrates the attachment portion 10h in the axial direction (Y axis direction). That is, the attachment hole 10i penetrates the attachment portion 10h. The attachment hole 10i is disposed in each attachment portion 10h. That is, a plurality of attachment holes 10i are provided. In the present example embodiment, two attachment holes 10i are provided. As shown in FIG. 3, when viewed from the axial direction of the second central axis J5, each attachment hole 10i is disposed to overlap each screw hole 82r. Each fixing screw 82j is inserted into each attachment hole 10i and screwed with each screw hole 82r.

According to the present example embodiment, the strainer 10 can be easily fixed to the first side wall portion 82b by inserting the discharge tube 10f into the wall hole 82c, inserting the fixing screw 82j into the attachment hole 10i, and screwing the fixing screw 82j into the screw hole 82r. Therefore, the attaching work of the strainer 10 is easy. The posture of the strainer 10 is stabilized, and the position of the suction port 10j can be stabilized with respect to the oil sump P. In the present example embodiment, the first side wall portion 82b has the detent portion 82q. Therefore, the discharge tube 10f is inserted into the wall hole 82c and the strainer 10 is rotated about the axis of the second central axis J5 to bring the attachment portion 10h into contact with the detent portion 82q, whereby the attachment hole 10i and the screw hole 82r of the first side wall portion 82b can be easily aligned, and the fixing screw 82j can be easily screwed.

When viewed from the axial direction of the second central axis J5, the discharge tube 10f is positioned between the two attachment portions 10h. In the present example embodiment, the discharge tube 10f is disposed between the two attachment portions 10h in the front-rear direction (X axis direction). According to the present example embodiment, the fixing screws 82j are inserted into the respective attachment holes 10i of the two attachment portions 10h and the respective fixing screws 82j are screwed into the screw holes 82r of the first side wall portion 82b, whereby the discharge tube 10f can be reliably pushed into the wall hole 82c even if the elastic ring 10g is fitted into the discharge tube 10f. This stabilizes the attachment posture of the strainer 10 with respect to the first side wall portion 82b, and stabilizes the sealability of the elastic ring 10g. In the present example embodiment, since the top wall portion 10c of the strainer 10 is inclined, the top wall portion 10c is unlikely to interfere with work when the fixing screw 82j is inserted and screwed into the attachment hole 10i of the attachment portion 10h at the end of the front side (+X side) of the strainer 10. Furthermore, the strainer 10 can be made compact.

In FIGS. 1 and 2, the inverter 7 is electrically connected to the motor 2. The inverter 7 supplies electric power to the motor 2. The inverter 7 is electrically connected to the stator 30 via a bus bar not illustrated, and supplies electric power to the stator 30. The bus bar electrically connects the motor 2 and the inverter 7. The bus bar extends across the inside of the housing 6 and the inside of the inverter case 8. The bus bar extends in the front-rear direction (X axis direction). A plurality of bus bars are provided. The plurality of bus bars are arranged at intervals from each other in the axial direction (Y axis direction) of the motor axis J1. The inverter 7 controls current supplied to the motor 2. Although not illustrated, the inverter 7 includes a circuit board and a capacitor.

The inverter case 8 accommodates the inverter 7 and is fixed with the housing 6. The inverter case 8 constitutes a part of an outer casing of the drive device 1. The inverter case 8 is made of metal, for example, and has conductivity. The housing 6 and the inverter case 8 are arranged side by side in the front-rear direction (X axis direction). The inverter case 8 is disposed adjacent to the motor accommodation portion 81 in the radial direction of the motor axis J1. The inverter case 8 and the motor accommodation portion 81 are arranged side by side in the front-rear direction. That is, the inverter case 8 and the housing 6 are connected in the horizontal direction. According to the present example embodiment, the outer dimension of the drive device 1 in the vertical direction is suppressed to be small. Therefore, it is easy to accommodate the drive device 1 in a limited installation space of the vehicle. The inverter case 8 includes a bottomed tubular case body 8d and a case lid portion 8e. The case lid portion 8e is fixed to the upper end of the case body 8d. The case lid portion 8e closes an upper opening of the case body 8d. The case lid portion 8e has a plate shape with a plate surface facing the vertical direction.

Note that the present disclosure is not limited to the above-described example embodiments, and for example, as described below, a configuration change or the like can be made without departing from the gist of the present disclosure.

In the above-described example embodiment, an example in which the strainer 10 is a substantially rectangular cuboid has been described, but the present disclosure is not limited thereto. The strainer 10 may have, for example, a columnar shape extending in the vertical direction. The strainer 10 is not limited to be made of resin, and may be made of metal, for example. In addition, the drive device 1 may include an electric actuator of a parking lock mechanism, for example.

In the above-described example embodiment, an example in which the oil pump 70 is an electric oil pump has been described, but the present disclosure is not limited thereto. Although not particularly illustrated, the oil pump may be, for example, a mechanical oil pump driven by power of the shaft 21 of the motor 2, a mechanical oil pump driven by power of the drive shaft of an engine in a hybrid vehicle, or the like.

In addition, the configurations (constituent elements) described in the above-described example embodiment, variations, notes, and the like may be combined in a rage without departing from the gist of the present disclosure, and addition, omission, substitution, and other modifications to the configurations are possible. In addition, the present disclosure is not limited by the above-described example embodiment, but is limited only by the claims.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A drive device that rotates an axle of a vehicle, the drive device comprising:
    a motor;
    a housing that accommodates the motor;
    an oil passage in the housing;
    an oil pump provided in the housing and in which a portion of the oil passage is provided; and
    a strainer provided inside the housing and in which a portion of the oil passage is provided; wherein
    the oil passage includes:
        an oil sump provided inside the housing and in which oil accumulates; and
        a suction path that connects the oil sump and the oil pump;
    a first central axis that is a central axis of the oil pump extends in a direction intersecting a vertical direction;
    the strainer is positioned in the suction path;
    the strainer includes:
        a suction port to suction oil from the oil sump;
        a discharge port to discharge oil toward the oil pump; and
        a filter that is provided inside the strainer and positioned between the suction port and the discharge port;
    the suction port opens downward in the vertical direction; and
    the discharge port opens in a direction intersecting the vertical direction toward the oil pump.

2. The drive device according to claim 1, further comprising:
    a decelerator that is connected to the motor; and
    a differential that is connected to the decelerator and rotates the axle about a differential axis; wherein
    the housing includes:
        a motor accommodation portion that accommodates the motor; and
        a gear accommodation portion that accommodates the decelerator and the differential; and
    the oil sump and the strainer are at a bottom portion of the gear accommodation portion.

3. The drive device according to claim 2, wherein
    the gear accommodation portion includes:
        a first side wall portion to which the strainer is attached; and
        a wall hole that opens on the first side wall portion and provides communication between the strainer and the oil pump;
    the strainer includes:
        a discharge tube that is inserted into the wall hole and in which the discharge port is provided; and
        an attachment portion that comes into contact with the first side wall portion; and
    the first side wall portion includes a detent portion that is opposed to and able to contact the attachment portion about a second central axis that is a central axis of the discharge tube.

4. The drive device according to claim 2, wherein
    the gear accommodation portion includes:
        a first side wall portion that is opposed to the differential from one axial side of the differential axis;
        a second side wall portion that is opposed to the differential from another axial side of the differential axis;

a plurality of screws that fix the first side wall portion and the second side wall portion in an axial direction of the differential axis; and a suction recess portion that is in at least any of a bottom portion of the first side wall portion and a bottom portion of the second side wall portion, is recessed downward in the vertical direction, and defines a portion of the oil sump;

the differential includes a gear that rotates about the differential axis;

a lower end of the gear in the vertical direction is in the oil sump;

the suction recess portion is provided between a pair of the screws adjacent to each other in a horizontal direction when viewed from the axial direction of the differential axis; and the suction port is in the suction recess portion.

5. The drive device according to claim 4, wherein the gear accommodation portion includes a projection portion that is in at least any of a bottom portion of the first side wall portion and a bottom portion of the second side wall portion and projects upward in the vertical direction; and when viewed from the axial direction of the differential axis, a horizontal position of the projection portion is between a horizontal position of a vertical lower end of the gear and a horizontal position of the suction recess portion.

6. The drive device according to claim 2, wherein, the gear accommodation portion includes:

a first side wall portion to which the strainer is attached; and a wall hole that opens on the first side wall portion and provides communication between the strainer and the oil pump;

the strainer includes a discharge tube that is inserted into the wall hole and in which the discharge port is provided; and when viewed from an axial direction of the second central axis, which is a central axis of the discharge tube, the discharge port and the suction port are shifted in a horizontal direction.

7. The drive device according to claim 6, wherein the strainer includes:

a bottom wall portion that is provided with the suction port;

a top wall portion that is vertically above the bottom wall portion at a distance from the bottom wall portion; and a peripheral wall portion that connects the bottom wall portion and the top wall portion and to which the discharge tube is connected; and the top wall portion is positioned vertically upward from the suction port toward the discharge tube along the horizontal direction.

8. The drive device according to claim 2, wherein an outer diameter of a gear included in the decelerator is smaller than an outer diameter of a gear included in the differential; and the strainer is immediately below a gear of the decelerator.

9. The drive device according to claim 2, wherein the gear accommodation portion includes:

a first side wall portion to which the strainer is attached; and a wall hole that opens on the first side wall portion and provides communication between the strainer and the oil pump;

the strainer includes:

a discharge tube that is inserted into the wall hole and in which the discharge port is provided;

an attachment portion that comes into contact with the first side wall portion; and an attachment hole that penetrates the attachment portion; and a fixing screw that fixes the attachment portion to the first side wall portion is inserted into the attachment hole.

10. The drive device according to claim 9, wherein the strainer includes an elastic ring that is fitted to an outer peripheral surface of the discharge tube;

two of the attachment portions are provided; and the discharge tube is positioned between the two attachment portions when viewed from an axial direction of a second central axis, which is a central axis of the discharge tube.

* * * * *